US010061221B2

(12) United States Patent
Orrock et al.

(10) Patent No.: US 10,061,221 B2
(45) Date of Patent: Aug. 28, 2018

(54) ENGINEERING-GRADE CONSUMABLE MATERIALS FOR ELECTROPHOTOGRAPHY-BASED ADDITIVE MANUFACTURING SYSTEM

(71) Applicant: Evolve Additive Solutions, Inc., Minnetonka, MN (US)

(72) Inventors: James E. Orrock, Eden Prairie, MN (US); Steven A. Chillscyzn, Victoria, MN (US); Trevor I. Martin, Burlington (CA)

(73) Assignee: Evolve Additive Solutions, Inc., Minnetonka, MN (US)

( * ) Notice: Subject to any disclaimer, the term of this patent is extended or adjusted under 35 U.S.C. 154(b) by 0 days.

(21) Appl. No.: 15/363,453

(22) Filed: Nov. 29, 2016

(65) Prior Publication Data

US 2017/0075245 A1 Mar. 16, 2017

Related U.S. Application Data

(63) Continuation of application No. 14/332,566, filed on Jul. 16, 2014, now Pat. No. 9,523,934.

(Continued)

(51) Int. Cl.

*G03G 13/22* (2006.01)
*G03G 13/08* (2006.01)

(Continued)

(52) U.S. Cl.

CPC ........... *G03G 13/22* (2013.01); *B29C 43/006* (2013.01); *B29C 64/153* (2017.08); *B29C 67/24* (2013.01);

(Continued)

(58) Field of Classification Search

CPC ...... G03G 13/22; B29C 43/006; B29C 64/153

See application file for complete search history.

(56) References Cited

U.S. PATENT DOCUMENTS 3,509,013 A 4/1970 Oppenlander
3,901,695 A 8/1975 Shelffo (Continued)

FOREIGN PATENT DOCUMENTS

EP 2465884 A1 6/2012
FR 2854764 A1 11/2004

(Continued)

OTHER PUBLICATIONS

Diamond, Arthur S & David Weiss (eds.) Handbook of Imaging Materials, 2nd ed., New York: Marcel-Dekker, Inc. (Nov. 2011) pp. 173-191.

(Continued)

*Primary Examiner* — Christopher D Rodee

(74) *Attorney, Agent, or Firm* — Peter J. Ims; Westman, Champlin & Koehler, P.A.

(57) ABSTRACT

A method of printing three-dimensional parts with an electrophotography-based additive manufacturing system, with a part material including a composition having an engineering-grade thermoplastic material and a charge control agent. The part material is provided in a powder form having a controlled particle size, and is configured for use in the electrophotography-based additive manufacturing system having a layer transfusion assembly for printing the three-dimensional parts in a layer-by-layer manner.

16 Claims, 4 Drawing Sheets

Related U.S. Application Data

(60) Provisional application No. 61/847,343, filed on Jul. 17, 2013.

(51) Int. Cl.

| | |
|---|---|
| ***G03G 9/097*** | (2006.01) |
| ***G03G 9/087*** | (2006.01) |
| ***G03G 9/08*** | (2006.01) |
| ***G03G 13/16*** | (2006.01) |
| ***G03G 13/20*** | (2006.01) |
| ***B29C 67/24*** | (2006.01) |
| ***B29C 43/00*** | (2006.01) |
| ***G03G 15/22*** | (2006.01) |
| ***G03G 15/08*** | (2006.01) |
| ***B29C 64/153*** | (2017.01) |
| *B29K 77/00* | (2006.01) |
| *B29K 105/00* | (2006.01) |
| *B33Y 30/00* | (2015.01) |

(52) U.S. Cl.

CPC ....... *G03G 9/0819* (2013.01); *G03G 9/08757* (2013.01); *G03G 9/08764* (2013.01); *G03G 9/08766* (2013.01); *G03G 9/08795* (2013.01); *G03G 9/08797* (2013.01); *G03G 9/09783* (2013.01); *G03G 9/09791* (2013.01); *G03G 13/08* (2013.01); *G03G 13/16* (2013.01); *G03G 13/20* (2013.01); *G03G 15/08* (2013.01); *G03G 15/224* (2013.01); *B29K 2077/00* (2013.01); *B29K 2105/005* (2013.01); *B29K 2105/0005* (2013.01); *B29K 2105/0023* (2013.01); *B29K 2105/251* (2013.01); *B29K 2995/0094* (2013.01); *B33Y 30/00* (2014.12)

(56) References Cited

U.S. PATENT DOCUMENTS 4,247,508 A 1/1981 Housholder
4,397,986 A 8/1983 Hornbaker
4,430,407 A 2/1984 Westdale
4,551,369 A 11/1985 Belz
4,671,982 A 6/1987 Belz
4,863,538 A 9/1989 Deckard
4,870,148 A 9/1989 Belz et al.
4,877,707 A 10/1989 Grushkin et al.
4,886,856 A 12/1989 Chen et al.
4,938,816 A 7/1990 Beaman et al.
4,944,817 A 7/1990 Bourell et al.
5,017,753 A 5/1991 Deckard
5,053,090 A 10/1991 Beaman et al.
5,076,869 A 12/1991 Bourell et al.
5,121,329 A 6/1992 Crump
5,132,143 A 7/1992 Deckard
5,155,324 A 10/1992 Deckard et al.
5,296,062 A 3/1994 Bourell et al.
5,303,141 A 4/1994 Batchelder et al.
5,316,580 A 5/1994 Deckard
5,340,433 A 8/1994 Crump
5,342,919 A 8/1994 Dickens, Jr. et al.
5,354,799 A 10/1994 Bennett et al.
5,382,308 A 1/1995 Bourell et al.
5,402,351 A 3/1995 Batchelder et al.
5,474,719 A 12/1995 Fan et al.
5,503,785 A 4/1996 Crump et al.
5,527,877 A 6/1996 Dickens, Jr. et al.
5,597,589 A 1/1997 Deckard
5,616,294 A 4/1997 Deckard
5,639,070 A 6/1997 Deckard
5,648,450 A 7/1997 Dickens, Jr. et al.
5,653,925 A 8/1997 Batchelder
5,695,707 A 12/1997 Almquist et al.
5,764,521 A 6/1998 Batchelder et al.
5,863,885 A 1/1999 Ruggieri et al.
5,866,058 A 2/1999 Batchelder et al.
5,939,008 A 8/1999 Comb et al.
5,976,749 A 11/1999 Sukata et al.
5,990,268 A 11/1999 Dickens, Jr. et al.
6,004,124 A 12/1999 Swanson et al.
6,022,207 A 2/2000 Dahlin et al.
6,067,480 A 5/2000 Stuffle et al.
6,070,107 A 5/2000 Lombardi et al.
6,129,872 A 10/2000 Jang
6,136,948 A 10/2000 Dickens, Jr. et al.
6,165,406 A 12/2000 Jang et al.
6,175,422 B1 1/2001 Penn et al.
6,228,923 B1 5/2001 Lombardi et al.
6,245,281 B1 6/2001 Scholten et al.
6,261,731 B1 7/2001 Iemura et al.
6,376,148 B1 * 4/2002 Liu ........................ B22F 3/008 156/273.1
6,420,080 B1 * 7/2002 Nakamura ........... G03G 15/161 399/343
6,531,255 B2 3/2003 Kim et al.
6,572,807 B1 6/2003 Fong
6,645,412 B2 11/2003 Priedeman, Jr.
6,722,872 B1 4/2004 Swanson et al.
6,780,368 B2 * 8/2004 Liu ..................... B29C 67/0081 264/112
6,790,403 B1 9/2004 Priedeman, Jr. et al.
6,814,907 B1 11/2004 Comb
6,923,634 B2 8/2005 Swanson et al.
7,077,638 B2 7/2006 Leyden et al.
7,122,246 B2 10/2006 Comb et al.
7,236,166 B2 6/2007 Zinniel et al.
7,255,821 B2 8/2007 Priedeman, Jr. et al.
7,261,542 B2 * 8/2007 Hickerson ........... B29C 67/0077 264/308
7,384,255 B2 6/2008 LaBossiere et al.
7,447,471 B2 * 11/2008 Landa .................... G03G 15/11 399/249
7,604,470 B2 10/2009 LaBossiere et al.
7,625,200 B2 12/2009 Leavitt
7,648,609 B2 1/2010 Leder et al.
7,754,807 B2 7/2010 Priedeman, Jr. et al.
7,794,647 B1 9/2010 Deckard
7,820,351 B2 10/2010 Suzuki et al.
7,896,209 B2 3/2011 Batchelder et al.
7,938,351 B2 5/2011 Taatjes et al.
7,938,356 B2 5/2011 Taatjes et al.
8,123,999 B2 2/2012 Priedeman, Jr. et al.
8,153,182 B2 4/2012 Comb et al.
8,173,258 B2 5/2012 Monsheimer et al.
8,221,669 B2 7/2012 Batchelder et al.
8,236,227 B2 8/2012 Batchelder et al.
8,246,888 B2 8/2012 Hopkins et al.
8,459,280 B2 6/2013 Swanson et al.
8,488,994 B2 * 7/2013 Hanson .................. G03G 13/00 399/130
8,718,522 B2 * 5/2014 Chillscyzn .......... B29C 67/0074 353/121
8,879,957 B2 * 11/2014 Hanson ................ G03G 15/225 399/130
9,023,566 B2 * 5/2015 Martin ............... G03G 9/08791 430/108.22
9,144,940 B2 * 9/2015 Martin ................ B29C 67/0092
2004/0222561 A1 11/2004 Hopkins
2005/0004282 A1 1/2005 Priedeman, Jr. et al.
2005/0129941 A1 6/2005 Comb et al.
2005/0173838 A1 8/2005 Priedeman, Jr. et al.
2005/0220983 A1 * 10/2005 Hayes ................. B29C 67/0096 427/8
2007/0123092 A1 5/2007 Legrand
2008/0169585 A1 7/2008 Zinniel
2008/0213419 A1 9/2008 Skubic et al.
2009/0236775 A1 9/2009 Monsheimer et al.
2009/0274540 A1 11/2009 Batchelder et al.
2010/0096072 A1 4/2010 Hopkins et al.
2010/0096485 A1 4/2010 Taatjes et al.
2010/0096489 A1 4/2010 Taatjes et al.
2010/0190005 A1 7/2010 Nair et al.
2010/0248119 A1 9/2010 Young et al.

(56) References Cited

U.S. PATENT DOCUMENTS

| | | | | |
|---|---|---|---|---|
| 2010/0283172 | A1 | 11/2010 | Swanson | |
| 2011/0074065 | A1 | 3/2011 | Batchelder et al. | |
| 2011/0186081 | A1 | 8/2011 | Dunn et al. | |
| 2011/0233804 | A1 | 9/2011 | Batchelder et al. | |
| 2011/0236683 | A1 | 9/2011 | Takebe et al. | |
| 2012/0041132 | A1 | 2/2012 | Monsheimer et al. | |
| 2012/0070523 | A1 | 3/2012 | Swanson et al. | |
| 2012/0164256 | A1 | 6/2012 | Swanson et al. | |
| 2012/0231225 | A1 | 9/2012 | Mikulak et al. | |
| 2012/0259052 | A1 | 10/2012 | Nelson et al. | |
| 2013/0075957 | A1 | 3/2013 | Swanson et al. | |
| 2013/0077996 | A1 | 3/2013 | Hanson et al. | |
| 2013/0077997 | A1 | 3/2013 | Hanson et al. | |
| 2013/0186549 | A1 | 7/2013 | Comb et al. | |
| 2013/0186558 | A1 | 7/2013 | Comb et al. | |
| 2014/0141166 | A1* | 5/2014 | Rodgers | C08L 77/02 427/256 |
| 2014/0141168 | A1* | 5/2014 | Rodgers | C08L 77/02 427/265 |
| 2015/0328665 | A1* | 11/2015 | DeFelice | C08J 3/12 241/24.28 |
| 2015/0336292 | A1* | 11/2015 | Mikulak | B29B 9/06 428/402 |

FOREIGN PATENT DOCUMENTS

| | | |
|---|---|---|
| GB | 816016 | 7/1959 |
| WO | 00/20215 A1 | 4/2000 |
| WO | 2010018789 A1 | 2/2010 |

OTHER PUBLICATIONS

"Standard Test Method for Deflection Temperature of Plastics Under Flexural Load in the Wedgewise Position": ASTM D648-07 (2007).

* cited by examiner

ENGINEERING-GRADE CONSUMABLE MATERIALS FOR ELECTROPHOTOGRAPHY-BASED ADDITIVE MANUFACTURING SYSTEM

CROSS-REFERENCE TO RELATED APPLICATION(S)

This application is a Continuation Application of U.S. patent application Ser. No. 14/332,566, filed Jul. 16, 2014, which claims priority to and the benefit of U.S. Provisional Patent Application No. 61/847,343, filed on Jul. 17, 2013, and entitled "Engineering-Grade Consumable Materials For Electrophotography-Based Additive Manufacturing System".

BACKGROUND

The present disclosure relates to additive manufacturing systems for printing three-dimensional (3D) parts and support structures. In particular, the present disclosure relates to consumable materials for printing 3D parts and support structures using an imaging process, such as electrophotography.

Additive manufacturing systems are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part or model may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed, and in some cases, for the sidewalls of the 3D part being formed. The support material adheres to the part material during fabrication, and is removable from the completed 3D part when the printing process is complete.

In two-dimensional (2D) printing, electrophotography (i.e., xerography) is a popular technology for creating 2D images on planar substrates, such as printing paper. Electrophotography systems include a conductive support drum coated with a photoconductive material layer, where latent electrostatic images are formed by charging and then image-wise exposing the photoconductive layer by an optical source. The latent electrostatic images are then moved to a developing station where toner is applied to charged areas of the photoconductive insulator to form visible images. The formed toner images are then transferred to substrates (e.g., printing paper) and affixed to the substrates with heat or pressure.

SUMMARY

An aspect of the present disclosure is directed to a part material for printing 3D parts with an electrophotography-based additive manufacturing system. The part material has a composition that includes an engineering-grade thermoplastic material (e.g., having a heat deflection temperature ranging from about 100° C. to about 150° C.) and a charge control agent. The part material is provided in a powder form having a controlled particle size (e.g., a D50 particle size ranging from about 5 micrometers to about 30 micrometers), and is configured for use in the electrophotography-based additive manufacturing system having a layer transfusion assembly for printing the 3D parts in a layer-by-layer manner. In some embodiments, the part material may be provided in an interchangeable cartridge or other similar device, along with carrier particles, for use with the electrophotography-based additive manufacturing system.

Another aspect of the present disclosure is directed to a method for printing a 3D part with an electrophotography-based additive manufacturing system having an electrophotography engine, a transfer medium, and a layer transfusion assembly. The method includes providing a part material to the electrophotography-based additive manufacturing system, where the part material compositionally includes a charge control agent and an engineering-grade thermoplastic material (e.g., having a heat deflection temperature ranging from about 100° C. to about 150° C.), and has a powder form. In some embodiments, the part material may be provided in an interchangeable cartridge or other similar device, along with carrier particles, for use with the electrophotography-based additive manufacturing system.

The method also includes triboelectrically charging the part material to a desired triboelectric charge (e.g., a Q/M ratio having a negative charge or a positive charge, and a magnitude ranging from about 5 micro-Coulombs/gram to about 50 micro-Coulombs/gram), and developing layers of the 3D part from the charged part material with the electrophotography engine. The method further includes electrostatically attracting the developed layers from the electrophotography engine to the transfer medium, moving the attracted layers to the layer transfusion assembly with the transfer medium, and transfusing the moved layers to previously-printed layers of the 3D part with the layer transfusion assembly.

DEFINITIONS

Unless otherwise specified, the following terms as used herein have the meanings provided below:

The term "copolymer" refers to a polymer having two or more monomer species, and includes terpolymers (i.e., copolymers having three monomer species).

The terms "at least one" and "one or more of" an element are used interchangeably, and have the same meaning that includes a single element and a plurality of the elements, and may also be represented by the suffix "(s)" at the end of the element. For example, "at least one polyimide", "one or more polyamides", and "polyamide(s)" may be used interchangeably and have the same meaning.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

The present disclosure is directed to amorphous and/or semi-crystalline, engineering-grade consumable materials, which are engineered for use in an electrophotography-based additive manufacturing system to print 3D parts with high resolutions and fast printing rates. During a printing operation, an electrophotography (EP) engine may develop or otherwise image each layer of the part (and any associated support material) using the electrophotography process. The developed layers are then transferred to a layer transfusion assembly where they are transfused (e.g., using heat and/or pressure) to print one or more 3D parts and support structures in a layer-by-layer manner.

In comparison to 2D printing, in which developed toner particles can be electrostatically transferred to printing paper by placing an electrical potential through the printing paper, the multiple printed layers in a 3D environment effectively prevents the electrostatic transfer of part and support materials after a given number of layers are printed (e.g., about 15 layers). Instead, each layer may be heated to an elevated transfer temperature, and then pressed against a previously-printed layer (or to a build platform) to transfuse the layers together in a transfusion step. This allows numerous layers of 3D parts and support structures to be built vertically, beyond what is otherwise achievable via electrostatic transfers.

As discussed below, the consumable material is a powder-based part material derived from one or more engineering-grade thermoplastic materials, a charge control agent, preferably a heat absorbent (e.g., an infrared absorber) if required, and optionally one or more additional materials, such as a flow control agent, which may also function as an external surface-treatment triboelectric charge control agent and/or a triboelectric modification additive. The part material is engineered for use with electrophotography-based additive manufacturing systems to print 3D parts having high part resolutions and good physical properties (e.g., good part strength, density, chemical resistance, usable temperature ranges, and the like). This allows the resulting 3D parts to function as end-use parts, if desired.

The part material of the present disclosure is preferably printed along with a powder-based support material that is engineered to complement the part materials. For example, each layer of the support material is preferably transfused along with an associated layer of the part material. As such, the support material preferably has a melt rheology that is similar to, or more preferably substantially the same as, the melt rheology of its associated part material.

Figure 1:
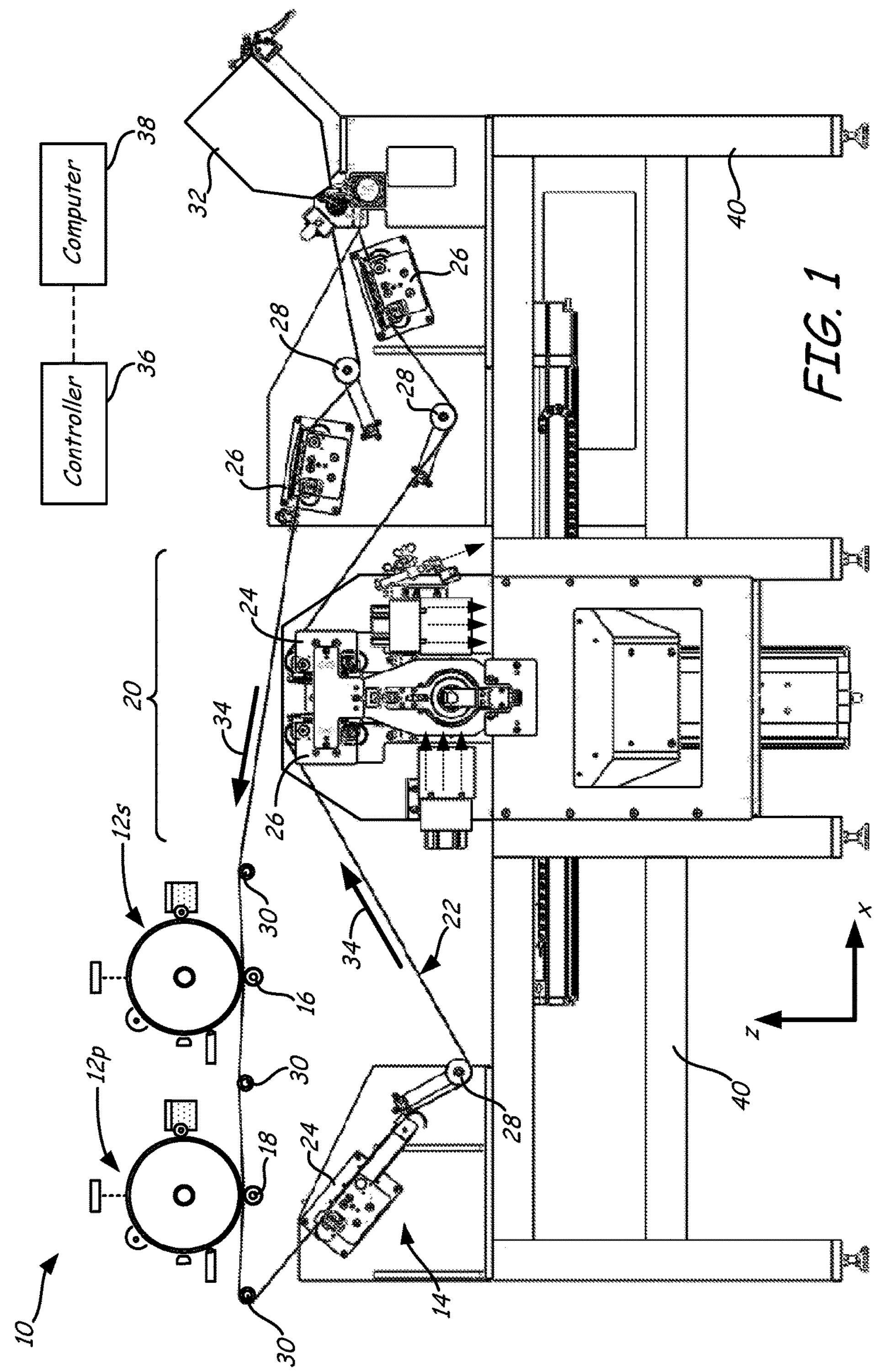
FIG. 1 is a front view of an example electrophotography-based additive manufacturing system for printing 3D parts from part materials of the present disclosure, along with associated support structures from support materials.

FIGS. 1-4 illustrate system 10, which is an example electrophotography-based additive manufacturing system for printing 3D parts and associated support structures with the part of the present disclosure, and associated support materials. As shown in FIG. 1, system 10 includes a pair of EP engines 12*p* and 12*s*, belt transfer assembly 14, biasing mechanisms 16 and 18, and layer transfusion assembly 20. Examples of suitable components and functional operations for system 10 include those disclosed in Hanson et al., U.S. Publication Nos. 2013/0077996 and 2013/0077997, and in Comb et al., U.S. patent application Ser. Nos. 13/790,382 and 13/790,406.

EP engines 12*p* and 12*s* are imaging engines for respectively imaging or otherwise developing layers of the part and support materials, where the part and support materials are each preferably engineered for use with the particular architecture of EP engine 12*p* or 12*s*. As discussed below, the imaged layers may then be transferred to belt transfer assembly 14 (or other transfer medium) with biasing mechanisms 16 and 18, and carried to layer transfusion assembly 20 to print the 3D parts and associated support structures in a layer-by-layer manner.

In the shown embodiment, belt transfer assembly 14 includes transfer belt 22, belt drive mechanisms 24, belt drag mechanisms 26, loop limit sensors 28, idler rollers 30, and belt cleaner 32, which are configured to maintain tension on belt 22 while belt 22 rotates in the rotational direction of arrows 34. In particular, belt drive mechanisms 24 engage and drive belt 22, and belt drag mechanisms 26 may function as brakes to provide a service loop design for protecting belt 22 against tension stress, based on monitored readings via loop limit sensors 28.

System 10 also includes controller 36, which is one or more control circuits, microprocessor-based engine control systems, and/or digitally-controlled raster imaging processor systems, and which is configured to operate the components of system 10 in a synchronized manner based on printing instructions received from host computer 38. Host computer 38 is one or more computer-based systems configured to communicate with controller 36 to provide the print instructions (and other operating information). For example, host computer 38 may transfer information to controller 36 that relates to the sliced layers of the 3D parts and support structures, thereby allowing system 10 to print the 3D parts and support structures in a layer-by-layer manner.

The components of system 10 may be retained by one or more frame structures, such as frame 40. Additionally, the components of system 10 are preferably retained within an enclosable housing (not shown) that prevents ambient light from being transmitted to the components of system 10 during operation.

Figure 2:
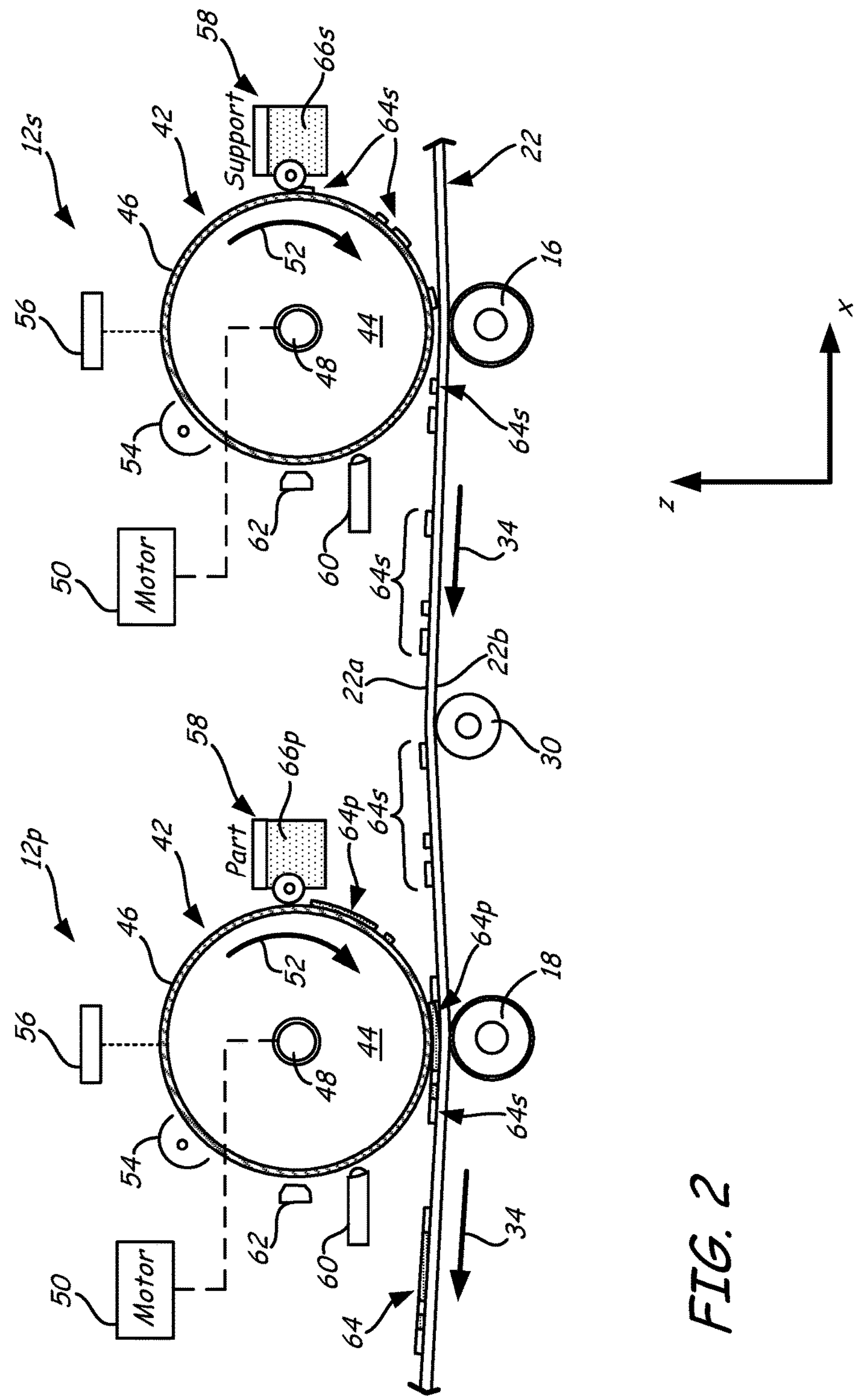
FIG. 2 is a schematic front view of a pair of electrophotography engines of the system for developing layers of the part and support materials.

FIG. 2 illustrates EP engines 12*p* and 12*s*, where EP engine 12*s* (i.e., the upstream EP engine relative to the rotational direction of belt 22) develops layers of the support material, and EP engine 12*p* (i.e., the downstream EP engine relative to the rotational direction of belt 22) develops layers of the part material. In alternative embodiments, the arrangement of EP engines 12*p* and 12*s* may be reversed such that EP engine 12*p* is upstream from EP engine 12*s* relative to the rotational direction of belt 22. In further alternative embodiments, system 10 may include three or more EP engines for printing layers of additional materials.

In the shown embodiment, EP engines 12*p* and 12*s* may include the same components, such as photoconductor drum 42 having conductive drum body 44 and photoconductive surface 46. Conductive drum body 44 is an electrically-conductive drum (e.g., fabricated from copper, aluminum, tin, or the like) that is electrically grounded and configured to rotate around shaft 48. Shaft 48 is correspondingly connected to drive motor 50, which is configured to rotate shaft 48 (and photoconductor drum 42) in the direction of arrow 52 at a constant rate.

Photoconductive surface 46 is a thin film extending around the circumferential surface of conductive drum body 44, and is preferably derived from one or more photoconductive materials, such as amorphous silicon, selenium, zinc oxide, organic materials, and the like. As discussed below, surface 46 is configured to receive latent-charged images of the sliced layers of a 3D part or support structure (or negative images), and to attract charged particles of the part or support material to the charged or discharged image areas, thereby creating the layers of the 3D part or support structure.

As further shown, EP engines 12*p* and 12*s* also includes charge inducer 54, imager 56, development station 58, cleaning station 60, and discharge device 62, each of which may be in signal communication with controller 36. Charge inducer 54, imager 56, development station 58, cleaning station 60, and discharge device 62 accordingly define an image-forming assembly for surface 46 while drive motor 50 and shaft 48 rotate photoconductor drum 42 in the direction of arrow 52.

In the shown example, the image-forming assembly for surface 46 of EP engine 12*s* is used to form layers 64*s* of the support material of the present disclosure (referred to as support material 66*s*), where a supply of support material 66*s* may be retained by development station 58 (of EP engine 12*s*) along with carrier particles. Similarly, the image-forming assembly for surface 46 of EP engine 12*p* is used to form layers 64*p* of the part material of the present disclosure (referred to as part material 66*p*), where a supply of part material 66*p* may be retained by development station 58 (of EP engine 12*p*) along with carrier particles.

Charge inducer 54 is configured to generate a uniform electrostatic charge on surface 46 as surface 46 rotates in the direction of arrow 52 past charge inducer 54. Suitable devices for charge inducer 54 include corotrons, scorotrons, charging rollers, and other electrostatic charging devices.

Imager 56 is a digitally-controlled, pixel-wise light exposure apparatus configured to selectively emit electromagnetic radiation toward the uniform electrostatic charge on surface 46 as surface 46 rotates in the direction of arrow 52 past imager 56. The selective exposure of the electromagnetic radiation to surface 46 is directed by controller 36, and causes discrete pixel-wise locations of the electrostatic charge to be removed (i.e., discharged to ground), thereby forming latent image charge patterns on surface 46.

Suitable devices for imager 56 include scanning laser (e.g., gas or solid state lasers) light sources, light emitting diode (LED) array exposure devices, and other exposure device conventionally used in 2D electrophotography systems. In alternative embodiments, suitable devices for charge inducer 54 and imager 56 include ion-deposition systems configured to selectively directly deposit charged ions or electrons to surface 46 to form the latent image charge pattern. As such, as used herein, the term "electrophotography" includes ionography.

Each development station 58 is an electrostatic and magnetic development station or cartridge that retains the supply of part material 66*p* or support material 66*s*, preferably in powder form, along with carrier particles. Development stations 58 may function in a similar manner to single or dual component development systems and toner cartridges used in 2D electrophotography systems. For example, each development station 58 may include an enclosure for retaining the part material 66*p* or support material 66*s* and carrier particles. When agitated, the carrier particles generate triboelectric charges to attract the powders of the part material 66*p* or support material 66*s*, which charges the attracted powders to a desired sign and magnitude, as discussed below.

Each development station 58 may also include one or more devices for transferring the charged part or support material 66*p* or 66*s* to surface 46, such as conveyors, fur brushes, paddle wheels, rollers, and/or magnetic brushes. For instance, as surface 46 (containing the latent charged image) rotates from imager 56 to development station 58 in the direction of arrow 52, the charged part material 66*p* or support material 66*s* is attracted to the appropriately charged regions of the latent image on surface 46, utilizing either charged area development or discharged area development (depending on the electrophotography mode being utilized). This creates successive layers 64*p* or 64*s* as photoconductor drum 12 continues to rotate in the direction of arrow 52, where the successive layers 64*p* or 64*s* correspond to the successive sliced layers of the digital representation of the 3D part or support structure.

The successive layers 64*p* or 64*s* are then rotated with surface 46 in the direction of arrow 52 to a transfer region in which layers 64*p* or 64*s* are successively transferred from photoconductor drum 42 to belt 22, as discussed below. While illustrated as a direct engagement between photoconductor drum 42 and belt 22, in some preferred embodiments, EP engines 12*p* and 12*s* may also include intermediary transfer drums and/or belts, as discussed further below.

After a given layer 64*p* or 64*s* is transferred from photoconductor drum 42 to belt 22 (or an intermediary transfer drum or belt), drive motor 50 and shaft 48 continue to rotate photoconductor drum 42 in the direction of arrow 52 such that the region of surface 46 that previously held the layer 64*p* or 64*s* passes cleaning station 60. Cleaning station 60 is a station configured to remove any residual, non-transferred portions of part or support material 66*p* or 66*s*. Suitable devices for cleaning station 60 include blade cleaners, brush cleaners, electrostatic cleaners, vacuum-based cleaners, and combinations thereof.

After passing cleaning station 60, surface 46 continues to rotate in the direction of arrow 52 such that the cleaned regions of surface 46 pass discharge device 62 to remove any residual electrostatic charge on surface 46, prior to starting the next cycle. Suitable devices for discharge device 62 include optical systems, high-voltage alternating-current corotrons and/or scorotrons, one or more rotating dielectric rollers having conductive cores with applied high-voltage alternating-current, and combinations thereof.

Transfer belt 22 is a transfer medium for transferring the developed successive layers 64*p* and 64*s* from photoconductor drum 42 (or an intermediary transfer drum or belt) to layer transfusion assembly 16. Examples of suitable transfer belts for belt 22 include those disclosed in Comb et al., U.S. patent application Ser. Nos. 13/790,382 and 13/790,406. Belt 22 includes front surface 22*a* and rear surface 22*b*, where front surface 22*a* faces surface 46 of photoconductor drum 42 and rear surface 22*b* is in contact with biasing mechanisms 16 and 18.

Biasing mechanisms 16 and 18 are configured to induce electrical potentials through belt 22 to electrostatically attract layers 64*p* and 64*s* from EP engines 12*p* and 12*s* to belt 22. Because layers 64*p* and 64*s* are each only a single layer increment in thickness at this point in the process, electrostatic attraction is suitable for transferring layers 64*p* and 64*s* from EP engines 12*p* and 12*s* to belt 22.

Controller 36 preferably rotates photoconductor drums 36 of EP engines 12*p* and 12*s* at the same rotational rates that are synchronized with the line speed of belt 22 and/or with any intermediary transfer drums or belts. This allows system 10 to develop and transfer layers 64*p* and 66*s* in coordination with each other from separate developer images. In particular, as shown, each part layer 64*p* may be transferred to belt 22 with proper registration with each support layer 64*s* to produce a combined part and support material layer 64. As can be appreciated, some layers transferred to layer transfusion assembly 20 may only include support material 66*s* or may only include part material 66*p*, depending on the particular support structure and 3D part geometries and layer slicing.

In an alternative embodiment, part layers 64*p* and support layers 64*s* may optionally be developed and transferred along belt 22 separately, such as with alternating layers 64*p* and 64*s*. These successive, alternating layers 64*p* and 64*s* may then be transferred to layer transfusion assembly 20, where they may be transfused separately to print the 3D part and support structure.

Figure 3:
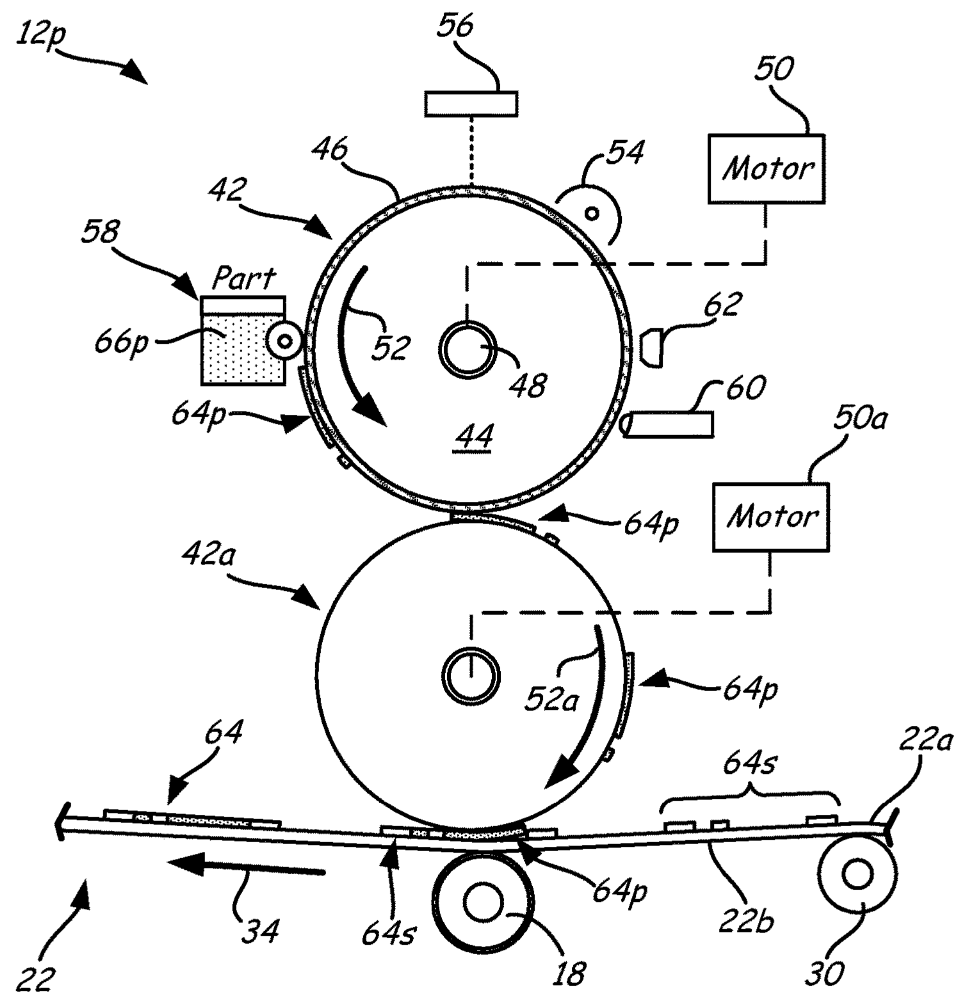
FIG. 3 is a schematic front view of an alternative electrophotography engine, which includes an intermediary drum or belt.

In a further alternative embodiment, one or both of EP engines 12*p* and 12*s* may also include one or more intermediary transfer drums and/or belts between photoconductor drum 42 and belt 22. For example, as shown in FIG. 3, EP engine 12*p* may also include intermediary drum 42*a* that rotates an opposing rotational direction from arrow 52, as illustrated by arrow 52*a*, under the rotational power of motor 50*a*. Intermediary drum 42*a* engages with photoconductor drum 42 to receive the developed layers 64*p* from photoconductor drum 42, and then carries the received developed layers 64*p* and transfers them to belt 22.

EP engine 12*s* may include the same arrangement of intermediary drum 42*a* for carrying the developed layers 64*s* from photoconductor drum 42 to belt 22. The use of such intermediary transfer drums or belts for EP engines 12*p* and 12*s* can be beneficial for thermally isolating photoconductor drum 42 from belt 22, if desired.

Figure 4:
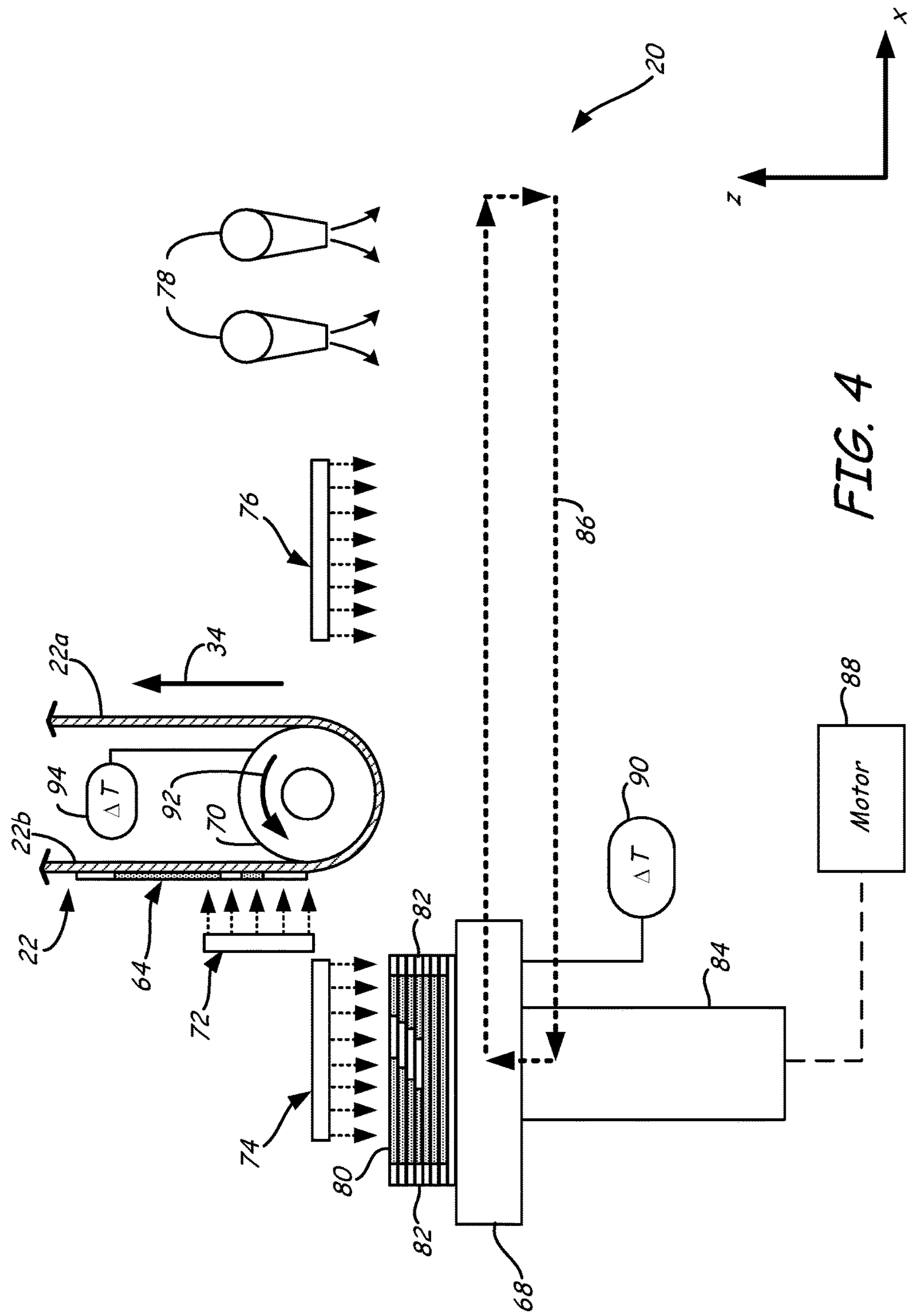
FIG. 4 is a schematic front view of a layer transfusion assembly of the system for performing layer transfusion steps with the developed layers.

FIG. 4 illustrates an example embodiment for layer transfusion assembly 20. As shown, layer transfusion assembly 20 includes build platform 68, nip roller 70, heaters 72 and 74, post-fuse heater 76, and air jets 78 (or other cooling units). Build platform 68 is a platform assembly or platen of system 10 that is configured to receive the heated combined layers 64 (or separate layers 64*p* and 64*s*) for printing a 3D part and support structure, referred to as 3D part 80 and support structure 82, in a layer-by-layer manner. In some embodiments, build platform 68 may include removable film substrates (not shown) for receiving the printed layers 64, where the removable film substrates may be restrained against build platform using any suitable technique (e.g., vacuum drawing).

Build platform 68 is supported by z-axis gantry 84, which is a guide mechanism configured to move build platform 68 along the z-axis and the x-axis to produce a reciprocating rectangular pattern, where the primary motion is back-and-forth along the x-axis (illustrated by broken lines 86. Gantry 84 may be operated by motor 88 based on commands from controller 36, where motor 88 may be an electrical motor, a hydraulic system, a pneumatic system, or the like.

In the shown embodiment, build platform 68 is heatable with heating element 90 (e.g., an electric heater). Heating element 90 is configured to heat and maintain build platform 68 at an elevated temperature that is greater than room temperature (25° C.), such as at a desired average part temperature of 3D part 80 and/or support structure 82, as discussed in Comb et al., U.S. patent application Ser. Nos. 13/790,382 and 13/790,406. This allows build platform 68 to assist in maintaining 3D part 80 and/or support structure 82 at this average part temperature.

Nip roller 70 is an example heatable element or heatable layer transfusion element, which is configured to rotate around a fixed axis with the movement of belt 22. In particular, nip roller 70 may roll against rear surface 22*b* in the direction of arrow 92 while belt 22 rotates in the direction of arrow 34. In the shown embodiment, nip roller 70 is heatable with heating element 94 (e.g., an electric heater). Heating element 94 is configured to heat and maintain nip roller 70 at an elevated temperature that is greater than room temperature (25° C.), such as at a desired transfer temperature for layers 64.

Heater 72 is one or more heating devices (e.g., an infrared heater and/or a heated air jet) configured to heat layers 64 to a temperature near an intended transfer temperature of the thermoplastic-based powder, such as at least a fusion temperature of the thermoplastic-based powder, prior to reaching nip roller 70. Each layer 64 desirably passes by (or through) heater 72 for a sufficient residence time to heat the layer 64 to the intended transfer temperature. Heater 74 may function in the same manner as heater 72, and heats the top surfaces of 3D part 80 and support structure 82 to an elevated temperature, such as at the same transfer temperature as the heated layers 64 (or other suitable elevated temperature).

As mentioned above, the support material of the present disclosure used to print support structure 82 preferably has a melt rheology that is similar to or substantially the same as the melt rheology part material of the present disclosure used to print 3D part 80. This allows part and support materials of layers 64_p_ and 64_s_ to be heated together with heater 74 to substantially the same transfer temperature, and also allows the part and support materials at the top surfaces of 3D part 80 and support structure 82 to be heated together with heater 74 to substantially the same temperature. Thus, the part layers 64_p_ and the support layers 64_s_ may be transfused together to the top surfaces of 3D part 80 and support structure 82 in a single transfusion step as combined layer 64.

Post-fuse heater 76 is located downstream from nip roller 70 and upstream from air jets 78, and is configured to heat the transfused layers to an elevated temperature in the post-fuse or heat-setting step. Again, the close melt rheologies of the part and support materials allow post-fuse heater 76 to post-heat the top surfaces of 3D part 80 and support structure 82 together in a single post-fuse step.

Prior to printing 3D part 80 and support structure 82, build platform 68 and nip roller 70 may be heated to their desired temperatures. For example, build platform 68 may be heated to the average part temperature of 3D part 80 and support structure 82 (due to the close melt rheologies of the part and support materials). In comparison, nip roller 70 may be heated to a desired transfer temperature for layers 64 (also due to the close melt rheologies of the part and support materials).

During the printing operation, belt 22 carries a layer 64 past heater 72, which may heat the layer 64 and the associated region of belt 22 to the transfer temperature. Suitable transfer temperatures for the part and support materials of the present disclosure include temperatures that exceed the glass transition temperature of the part and support materials, where the layer material is softened but not melted.

As further shown in FIG. 4, during operation, gantry 84 may move build platform 68 (with 3D part 80 and support structure 82) in a reciprocating rectangular pattern 86. In particular, gantry 84 may move build platform 68 along the x-axis below, along, or through heater 74. Heater 74 heats the top surfaces of 3D part 80 and support structure 82 to an elevated temperature, such as the transfer temperatures of the part and support materials. As discussed in Comb et al., U.S. patent application Ser. Nos. 13/790,382 and 13/790,406, heaters 72 and 74 may heat layers 64 and the top surfaces of 3D part 80 and support structure 82 to about the same temperatures to provide a consistent transfusion interface temperature. Alternatively, heaters 72 and 74 may heat layers 64 and the top surfaces of 3D part 80 and support structure 82 to different temperatures to attain a desired transfusion interface temperature.

The continued rotation of belt 22 and the movement of build platform 68 align the heated layer 64 with the heated top surfaces of 3D part 80 and support structure 82 with proper registration along the x-axis. Gantry 84 may continue to move build platform 68 along the x-axis, at a rate that is synchronized with the rotational rate of belt 22 in the direction of arrow 34 (i.e., the same directions and speed). This causes rear surface 22_b_ of belt 22 to rotate around nip roller 70 to nip belt 22 and the heated layer 64 against the top surfaces of 3D part 80 and support structure 82. This presses the heated layer 64 between the heated top surfaces of 3D part 80 and support structure 82 at the location of nip roller 70, which at least partially transfuses heated layer 64 to the top layers of 3D part 80 and support structure 82.

As the transfused layer 64 passes the nip of nip roller 70, belt 22 wraps around nip roller 70 to separate and disengage from build platform 68. This assists in releasing the transfused layer 64 from belt 22, allowing the transfused layer 64 to remain adhered to 3D part 80 and support structure 82. Maintaining the transfusion interface temperature at a transfer temperature that is higher than its glass transition temperature, but lower than its fusion temperature, allows the heated layer 64 to be hot enough to adhere to 3D part 80 and support structure 82, while also being cool enough to readily release from belt 22. Additionally, as discussed above, the close melt rheologies of the part and support materials allow them to be transfused in the same step.

After release, gantry 84 continues to move build platform 68 along the x-axis to post-fuse heater 76. At post-fuse heater 76, the top-most layers of 3D part 80 and support structure 82 (including the transfused layer 64) may then be heated to at least the fusion temperature of the thermoplastic-based powder in a post-fuse or heat-setting step. This melts the material of the transfused layer 64 to a highly fusable state such that polymer molecules of the transfused layer 64 quickly interdiffuse to achieve a high level of interfacial entanglement with 3D part 80 and support structure 82.

Additionally, as gantry 84 continues to move build platform 68 along the x-axis past post-fuse heater 76 to air jets 78, air jets 78 blow cooling air towards the top layers of 3D part 80 and support structure 82. This actively cools the transfused layer 64 down to the average part temperature, as discussed in Comb et al., U.S. patent application Ser. Nos. 13/790,382 and 13/790,406.

To assist in keeping 3D part 80 and support structure 82 at the average part temperature, in some preferred embodiments, heater 74 and/or post-heater 76 may operate to heat only the top-most layers of 3D part 80 and support structure 82. For example, in embodiments in which heaters 72, 74, and 76 are configured to emit infrared radiation, 3D part 80 and support structure 82 may include heat absorbers and/or other colorants configured to restrict penetration of the infrared wavelengths to within the top-most layers. Alternatively, heaters 72, 74, and 76 may be configured to blow heated air across the top surfaces of 3D part 80 and support structure 82. In either case, limiting the thermal penetration into 3D part 80 and support structure 82 allows the top-most layers to be sufficiently transfused, while also reducing the amount of cooling required to keep 3D part 80 and support structure 82 at the average part temperature.

Gantry 84 may then actuate build platform 68 downward, and move build platform 68 back along the x-axis to a starting position along the x-axis, following the reciprocating rectangular pattern 86. Build platform 68 desirably reaches the starting position for proper registration with the next layer 64. In some embodiments, gantry 84 may also actuate build platform 68 and 3D part 80/support structure 82 upward for proper registration with the next layer 64. The same process may then be repeated for each remaining layer 64 of 3D part 80 and support structure 82.

After the printing operation is completed, the resulting 3D part 80 and support structure 82 may be removed from system 10 and undergo one or more post-printing operations. For example, support structure 82 may be sacrificially removed from 3D part 80 using an aqueous-based solution, such as an aqueous alkali solution. Under this technique, support structure 82 may at least partially dissolve in the solution, separating it from 3D part 80 in a hands-free manner.

In comparison, part materials are chemically resistant to aqueous alkali solutions. This allows the use of an aqueous alkali solution to be employed for removing the sacrificial support structure 82 without degrading the shape or quality of 3D part 80. Examples of suitable systems and techniques for removing support structure 82 in this manner include those disclosed in Swanson et al., U.S. Pat. No. 8,459,280; Hopkins et al., U.S. Pat. No. 8,246,888; and Dunn et al., U.S. Publication No. 2011/0186081; each of which are incorporated by reference to the extent that they do not conflict with the present disclosure.

Furthermore, after support structure 82 is removed, 3D part 80 may undergo one or more additional post-printing processes, such as surface treatment processes. Examples of suitable surface treatment processes include those disclosed in Priedeman et al., U.S. Pat. No. 8,123,999; and in Zinniel, U.S. Publication No. 2008/0169585.

As briefly discussed above, the part material of the present disclosure compositionally includes one or more amorphous and/or semi-crystalline, engineering-grade thermoplastic materials, such as one or more polyamides, polyoxymethylenes, polycarbonates, polysulfones, thermoplastic polyurethanes, copolymers thereof, and mixtures thereof. These thermoplastics typically have heat deflection temperatures ranging from about 100° C. to about 150° C. Examples of suitable engineering-grade thermoplastic materials are discussed further below in conjunction with associated techniques for producing powders of the part materials.

As used herein, semi-crystalline thermoplastic materials have measureable melting points (5 calories/gram or more) using differential scanning calorimetry (DSC) pursuant to ASTM D3418-08. Furthermore, the semi-crystalline thermoplastic materials are preferably polymeric materials (e.g., polymers) capable of exhibiting an average percent crystallinity in a solid state of at least about 10% by weight, and include polymeric materials having crystallinities up to 100% (i.e., fully-crystalline polymeric materials). In comparison, amorphous thermoplastic materials have substantially no measurable melting points (less than 5 calories/gram) using DSC pursuant to ASTM D3418-08.

As mentioned above, the part material is engineered for use in an EP-based additive manufacturing system (e.g., system 10) to print 3D parts (e.g., 3D part 80). As such, the part material may also include one or more materials to assist in developing layers with EP engine 12*p*, to assist in transferring the developed layers from EP engine 12*p* to layer transfusion assembly 20, and to assist in transfusing the developed layers with layer transfusion assembly 20.

For example, in the electrophotographic process with system 10, the part material is preferably charged triboelectrically through the mechanism of frictional contact charging with carrier particles at development station 58. This charging of the part material may be referred to by its triboelectric charge-to-mass (Q/M) ratio, which may be a positive or negative charge and has a desired magnitude. The Q/M ratio is inversely proportional to the powder density of the part material, which can be referred to by its mass per unit area (M/A) value. For a given applied development field, as the value of Q/M ratio of the part material is increased from a given value, the M/A value of the part material decreases, and vice versa. Thus, the powder density for each developed layer of the part material is a function of the Q/M ratio of the part material.

It has been found that, in order to provide successful and reliable development of the part material onto development drum 44 and transfer to layer transfusion assembly 20 (e.g., via belt 22), and to print 3D part 80 with a good material density, the part material preferably has a suitable Q/M ratio for the particular architecture of EP engine 12*p* and belt 22. Examples of preferred Q/M ratios for the part material range from about −5 micro-Coulombs/gram (μC/g) to about −50 μC/g, more preferably from about −10 μC/g to about −40 μC/g, and even more preferably from about −15 μC/g to about −35 μC/g, and even more preferably from about −25 μC/g to about −30 μC/g.

In this embodiment, the Q/M ratio is based on a negative triboelectric charge. However, in an alternative embodiment, system 10 may operate such that the Q/M ratio of the part material has a positive triboelectric charge with the above-discussed magnitudes. In either embodiment, these magnitudes of Q/M ratio prevent the electrostatic forces constraining the part material to the carrier surfaces from being too excessive, and that any level of "wrong sign" powder is minimized. This reduces inefficiencies in the development of the part material at EP engine 12*p*, and facilitates the development and transfer of each layer 64*p* with the desired M/A value.

Furthermore, if a consistent material density of 3D part 80 is desired, the desired Q/M ratio (and corresponding M/A value) is preferably maintained at a stable level during an entire printing operation with system 10. However, over extended printing operations with system 10, development station 58 may need to be replenished with additional amounts of the part material. This can present an issue because, when introducing additional amounts of the part material to development station 58 for replenishment purposes, the part material is initially in an uncharged state until mixing with the carrier particles. As such, the part material also preferably charges to the desired Q/M ratio at a rapid rate to maintain a continuous printing operation with system 10.

Accordingly, controlling and maintaining the Q/M ratio during initiation of the printing operation, and throughout the duration of the printing operation, will control the resultant rate and consistency of the M/A value of the part material. In order to reproducibly and stably achieve the desired Q/M ratio, and hence the desired M/A value, over extended printing operations, the part material preferably includes one or more charge control agents, which may be added to the copolymer during the manufacturing process of the part material.

In embodiments in which the Q/M ratio of the part material has a negative charge, suitable charge control agents for use in the part material include acid metal complexes (e.g., oxy carboxylic acid complexes of chromium, zinc, and aluminum), azo metal complexes (e.g., chromium azo complexes and iron azo complexes), mixtures thereof, and the like.

Alternatively, in embodiments in which the Q/M ratio of the part material has a positive charge, suitable charge control agents for use in the part material include azine-based compounds, and quaternary ammonium salts, mixtures thereof, and the like. These agents are effective at positively charging the copolymer when frictionally contact charged against appropriate carrier particles.

The charge control agents preferably constitute from about 0.1% by weight to about 5% by weight of the part material, more preferably from about 0.5% by weight to about 2% by weight, and even more preferably from about 0.75% by weight to about 1.5% by weight, based on the entire weight of the part material. As discussed above, these charge control agents preferably increase the charging rate of the copolymer against the carrier, and stabilize the Q/M ratio over extended continuous periods of printing operations with system 10.

In many situations, system 10 prints layers 64*p* with a substantially consistent material density over the duration of the printing operations. Having a part material with a controlled and consistent the Q/M ratio allows this to be achieved. However, in some situations, it may be desirable to adjust the material density between the various layers 64*p* in the same printing operation. For example, system 10 may be operated to run in a grayscale manner with reduced material density, if desired, for one or more portions of 3D part 80.

In addition to incorporating the charge control agents, for efficient operation EP engine 12*p*, and to ensure fast and efficient triboelectric charging during replenishment of the part material, the mixture of the part material preferably exhibits good powder flow properties. This is preferred because the part material is fed into a development sump (e.g., a hopper) of development station 58 by auger, gravity, or other similar mechanism, where the part material undergoes mixing and frictional contact charging with the carrier particles.

As can be appreciated, blockage or flow restrictions of the part material during the replenishment feeding can inhibit the supply of the part material to the carrier particles. Similarly, portions of the part material should not become stuck in hidden cavities in development station 58. Each of these situations can alter the ratio of the part material to the carrier particles, which, as discussed above, is preferably maintained at a constant level to provide the desired Q/M ratio for the charged part material.

For example, the part material may constitute from about 1% by weight to about 30% by weight, based on a combined weight of the part material and the carrier particles, more preferably from about 5% to about 20%, and even more preferably from about 5% to about 10%. The carrier particles accordingly constitute the remainder of the combined weight.

The powder flow properties of the part material can be improved or otherwise modified with the use of one or more flow control agents, such as inorganic oxides. Examples of suitable inorganic oxides include hydrophobic fumed inorganic oxides, such as fumed silica, fumed titania, fumed alumina, mixtures thereof, and the like, where the fumed oxides may be rendered hydrophobic by silane and/or siloxane-treatment processes. Examples of commercially available inorganic oxides for use in the part material include those under the tradename "AEROSIL" from Evonik Industries AG, Essen, Germany.

The flow control agents (e.g., inorganic oxides) preferably constitute from about 0.1% by weight to about 10% by weight of the part material, more preferably from about 0.2% by weight to about 5% by weight, and even more preferably from about 0.3% by weight to about 1.5% by weight, based on the entire weight of the part material.

As discussed above, the one or more charge control agents are suitable for charging the part material to a desired Q/M ratio for developing layers of the part material at EP engine 12*p*, and for transferring the developed layers (e.g., layers 64) to layer transfusion assembly 20 (e.g., via belt 22). However, the multiple printed layers in a 3D environment effectively prevents the electrostatic transfer of part material after a given number of layers are printed. Instead, layer transfusion assembly 20 utilizes heat and pressure to transfuse the developed layers together in the transfusion steps.

In particular, heaters 72 and/or 74 may heat layers 64 and the top surfaces of 3D part 80 and support structure 82 to a temperature near an intended transfer temperature of the part material, such as at least a fusion temperature of the part material, prior to reaching nip roller 70. Similarly, post-fuse heater 76 is located downstream from nip roller 70 and upstream from air jets 78, and is configured to heat the transfused layers to an elevated temperature in the post-fuse or heat-setting step.

Accordingly, the part material may also include one or more heat absorbers configured to increase the rate at which the part material is heated when exposed to heater 72, heater 74, and/or post-heater 76. For example, in embodiments in which heaters 72, 74, and 76 are infrared heaters, the heat absorber(s) used in the part material may be one or more infrared (including near-infrared) wavelength absorbing materials. As discussed below, these heat absorbers may be incorporated into the particles of the copolymer during the manufacturing of the part material. Absorption of infrared light causes radiationless decay of energy to occur within the particles, which generates heat in the part material.

The heat absorber is preferably soluble or dispersible in the solvated copolymers used for the preparation of the part material with a limited coalescence process, as discussed below. Additionally, the heat absorber also preferably does not interfere with the formation of the copolymer particles, or stabilization of these particles during the manufacturing process. Furthermore, the heat absorber preferably does not interfere with the control of the particle size and particle size distribution of the copolymer particles, or the yield of the copolymer particles during the manufacturing process.

Suitable infrared absorbing materials for use in the part material may vary depending on the desired color of the part material. Examples of suitable infrared absorbing materials include carbon black (which may also function as a black pigment for the part material), as well as various classes of infrared absorbing pigments and dyes, such as those that exhibit absorption in the wavelengths ranging from about 650 nanometers (nm) to about 900 nm, those that exhibit absorption in the wavelengths ranging from about 700 nm to about 1,050 nm, and those that exhibit absorption in the wavelengths ranging from about 800 nm to about 1,200 nm. Examples of these pigments and dyes classes include anthraquinone dyes, polycyanine dyes metal dithiolene dyes and pigments, tris aminium dyes, tetrakis aminium dyes, mixtures thereof, and the like.

The infrared absorbing materials also preferably do not significantly reinforce or otherwise alter the melt rheological properties of the engineering-grade thermoplastic material, such as the zero shear viscosity versus temperature profile of the engineering-grade thermoplastic material. For example, this can be achieved using a non-reinforcing type of carbon black, or a "low structure" type of carbon black, at low concentrations relative to the engineering-grade thermoplastic material.

Accordingly, in embodiments that incorporate heat absorbers, the heat absorbers (e.g., infrared absorbers) preferably constitute from about 0.5% by weight to about 10% by weight of the part material, more preferably from about 1% by weight to about 5% by weight, and in some more preferred embodiments, from about 2% by weight to about 3% by weight, based on the entire weight of the part material.

The part material may also include one or more additional additives that preferably do not interfere with the formation of the thermoplastic particles, or stabilization of these particles during the manufacturing process, and that preferably do not interfere with the control of the particle size and particle size distribution of the thermoplastic particles, or the yield of the thermoplastic particles during the manufacturing process.

Examples of suitable additional additives include colorants (e.g., pigments and dyes in addition to, or alternatively to, the heat absorbers), polymer stabilizers (e.g., antioxidants, light stabilizers, ultraviolet absorbers, and antiozonants), biodegradable additives, and combinations thereof. In embodiments that incorporate additional additives, the additional additives may collectively constitute from about 0.1% by weight to about 10% by weight of the part material, more preferably from about 0.2% by weight to about 5% by weight, and even more preferably from about 0.5% by weight to about 2% by weight, based on the entire weight of the part material.

For use in electrophotography-based additive manufacturing systems (e.g., system 10), the part material preferably has a controlled average particle size and a narrow particle size distribution, as described below in the Particle Sizes and Particle Size Distributions standard. For example, preferred D50 particles sizes include those up to about 100 micrometers if desired, more preferably from about 10 micrometers to about 30 micrometers, more preferably from about 10 micrometers to about 20 micrometers, and even more preferably from about 10 micrometers to about 15 micrometers.

Additionally, the particle size distributions, as specified by the parameters D90/D50 particle size distributions and D50/D10 particle size distributions, each preferably range from about 1.00 to 1.40, more preferably from about 1.10 and to about 1.35, and even more preferably from about 1.15 to about 1.25. Moreover, the particle size distribution is preferably set such that the geometric standard deviation $\sigma_g$ preferably meets the criteria pursuant to the following Equation 1:

$$\sigma_g \sim \frac{D90}{D50} \sim \frac{D50}{D10}$$

In other words, the D90/D50 particle size distributions and D50/D10 particle size distributions are preferably the same value or close to the same value, such as within about 10% of each other, and more preferably within about 5% of each other.

The part material is preferably manufactured by polymerizing or otherwise providing the engineering-grade thermoplastic material(s), and then formulating the part material from the engineering-grade thermoplastic material(s) (and other components) with the above-discussed particle sizes and particle size distributions. The particular formulation technique, however, is dependent on the engineering-grade thermoplastic material utilized in the part material.

For instance, when the engineering-grade thermoplastic material is a polyamide material, the part material may be produced with a milling process, a spray-drying process, or a limited coalescence process. Following the milling or spray-drying process, the resulting powder may undergo one or more additional classification processes to attain the desired particle sizes and particle size distribution, if required. Examples of suitable milling systems for the milling process include those commercially available under the tradename "IMD GRAN-U-LIZERS" from Modern Process Equipment Corporation, Chicago, Ill.

In some embodiments, the milling process may be performed as a cryomilling process. For example, a feedstock of the polyamide(s), the charge control agent, any heat absorber, and/or any additional additive may be suspended as a cryogen slurry (e.g., in liquid nitrogen or liquid argon), and then undergo a cryomilling process at cryogenic temperatures.

Alternatively, in a spray-drying process, a feedstock of the polyamide(s), the charge control agent, any heat absorber, and/or any additional additives may be dissolved or otherwise suspended in a carrier liquid (e.g., solvent). The resulting solution or slurry is then sprayed from an atomizer or spray nozzle along with a heated drying gas (e.g., heated dry air or nitrogen). The heated drying gas can be passed as a co-current or counter-current flow to the spray direction, as desired.

The sprayed droplets of the solution or slurry rapidly dry to produce the powder form of the part material, preferably with controlled particle sizes and a narrow particle size distribution. The powder may then be collected and undergo one or more additional classification processes to attain the desired particle sizes and particle size distribution, if required. The flow control agent may also optionally be blended with the powder at this point in the process, if desired.

In a further alternative embodiment, the part material may be formulated from the polyamide(s) with a limited coalescence process, such as the process disclosed in Bennett et al., U.S. Pat. No. 5,354,799. For example, the constituents of the part material (e.g., the polyamide(s), charge control agent, heat absorber, and/or additional additives) may be dissolved or otherwise suspended in an organic solvent to a suitable concentration range such as from about 10% to about 20% by weight of the poylamide(s) in the organic solvent. Examples of suitable organic solvents include ethyl acetate, propyl acetate, butyl acetate, dichloromethane, methyl ethyl ketone, cyclohexane, toluene, mixtures thereof, and the like.

Separately, a buffered acidic aqueous solution may be prepared containing a dispersant such as colloidal silica, and preferably a water-droplet interface promoter, such as poly (adipic acid-co-methylaminoethanol). The organic solvent solution may then be slowly (e.g., incrementally) added to the buffered acidic aqueous solution while subjecting the whole mixture to high shear mixing, such as with a homogenizer. This creates droplets of the organic phase of controlled size and size distribution, which are stabilized by the colloidal silica in the aqueous phase. This mixing preferably continues until droplet growth and creation is completed.

The stabilized solvated droplet suspension may then be passed to a flash evaporator, where the organic solvent may be removed to a condensate tank using applied vacuum. The solid particles of the resulting part material, which remain dispersed in the aqueous phase, may then be transferred to a stirred holding vessel, and the colloidal silica may be removed, such as with the use of an aqueous sodium hydroxide solution, filtration, and water.

The part material may then be dried to produce its powder form. If necessary, following particle size analysis, the dry powder of the part material may be subjected to further sieving to remove oversize particles, and/or classification to remove any level of fines that are considered detrimental to subsequent performance in system 10. This process typically produces the part material in a yield ranging from about 90% by weight to about 99% by weight, based on the original amount of the polyamide(s) employed.

Examples of suitable polyamide materials for use in the part material may include polyamide homopolymers and copolymers derived from monomers that include caprolactam, diamines in combination with monomers that include dicarboxylic acids, and mixtures thereof. The diamine monomers and the dicarboxylic acid monomers are each preferably aliphatic monomers, and more preferably are each acyclic aliphatic monomers. However, in other embodiments, the diamine monomers and/or the dicarboxylic acid monomers may include aromatic or cycloaliphatic groups while maintaining crystalline domains. Furthermore, in some embodiments, the semi-crystalline polyamide(s) may include cyclic groups in grafted pendant chains (e.g., maleated groups), as discussed below. Preferred polyamide homopolymers and copolymers for the semi-crystalline polyamide(s) may be represented by the following structural formulas:

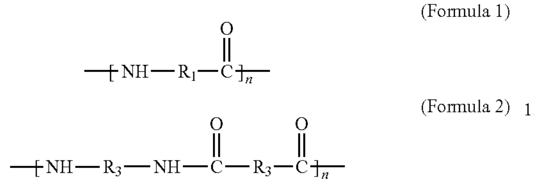

where $R_1$, $R_2$, and $R_3$ may each be a hydrocarbon chain having 3-12 carbon atoms. The hydrocarbon chains for $R_1$, $R_2$, and $R_3$ may be branched (e.g., having small alkyl groups, such as methyl groups) or unbranched, and which are preferably aliphatic, acyclic, saturated hydrocarbon chains.

As used herein, reference to a repeating unit identifier "n" in a polymer structural formula means that the bracketed formula repeats for n units, where n is a whole number that may vary depending on the molecular weight of the given polymer. Furthermore, the particular structures of the bracketed formulas may be the same between the repeating units (i.e., a homopolymer) or may be vary between the repeating units (i.e., copolymer). For example, in the above-shown Formula 1, $R_1$ may be the same structure for each repeating unit to provide a homopolymer, or may be two or more different structures that repeat in an alternating copolymer manner, a random copolymer manner, a block copolymer manner, a graft copolymer manner (as discussed below), or combinations thereof.

Preferred polyamides include nylon-type materials such as polycarpolactum (PA6), polyhexamethyleneaidpamide (PA6,6), polyhexamethylenenonamide (PA6,9), polyhexamethylenesebacamide (PA6,10), polyamide 6/12 (PA6,12), polyenantholactum (PA7), polyundecanolactum (PA11), polylaurolactam (PA12), and mixtures thereof. More preferably, the polyamides for the semi-crystalline polyamide(s) include PA6; PA6,6; PA 6,12; PA11; polylaurolactam (PA12), and mixtures thereof.

In embodiments in which the engineering-grade thermoplastic material is a polyoxymethylene material, a polycarbonate material, or a thermoplastic polyurethane material, the part material may be produced with either of the above-discussed milling process or the above-discussed spray-drying process. Additionally, for polycarbonate materials and thermoplastic polyurethane materials, the part material may be produced with above-discussed limited coalescence process. With any of these techniques technique, the resulting powder may also undergo one or more additional classification processes to attain the desired particle sizes and particle size distribution, if required.

Examples of suitable polyoxymethylene materials for use in the part material include acetal copolymers, acetal homopolymers, and mixtures thereof, more preferably acetal homopolymers, such as those commercially available under the tradename "DELRIN" from E.I. du Pont de Nemours and Company, Wilmington, Del.

After being formulated, the part material preferably has particle sizes and particle size distributions as discussed above. In some embodiments, the resulting part material may be surface treated with one or more external flow control agents, as discussed above, to increase the powder flow properties of the part material. For example, the part material may be dry blended under high speed and sheer, preferably at 25° C., with one or more external flow control agents. This uniformly distributes, coats, and partially embeds the flow control agent(s) into the individual particles of the part material, without significantly altering the particle size or particle size distribution.

The formulated part material may then be filled into a cartridge or other suitable container for use with EP engine **12*p* in system 10. For example, the formulated part material may be supplied in a cartridge, which may be interchangeably connected to a hopper of development station 58. In this embodiment, the formulated part material may be filled into development station 58 for mixing with the carrier particles, which may be retained in development station 58. Development station 58** may also include standard toner development cartridge components, such as a housing, delivery mechanism, communication circuit, and the like.

The carrier particles in development station 58 may be any suitable magnetized carrier particles for charging the part material, such as carrier particles having strontium ferrite cores with polymer coatings. The cores are typically larger in size than the particles of the part material, such as averaging from about 20 micrometers to about 40 micrometers in diameter. The polymer coatings may vary depending on the Q/M ratios desired for the part material. Examples of suitable polymer coatings include poly(methyl methacrylate) (PMMA) for negative charging, or poly(vinylidene fluoride) (PVDF) for positive charging. Suitable weight ratios of the part material to the carrier particles in development station or cartridge 58 include those discussed above.

Alternatively, development station 58 itself may be an interchangeable cartridge device that retains the supply of the part material. In further alternative embodiments, EP engine **12*p*** itself may be an interchangeable device that retains the supply of the part material.

When the part material is loaded to system 10, system 10 may then perform printing operations with the part material to print 3D parts (e.g., 3D part 80), preferably with a suitable support structure (e.g., support structure 82). The layers of each 3D part are developed from the part material with EP engine **12*p* and transferred to layer transfusion assembly 20**, where they are heated and transfused to each other to print the 3D parts in a layer-by-layer manner using an additive manufacturing technique.

In some preferred embodiments, a resulting 3D part is encased laterally (i.e., horizontally to the build plane) in the support structure, as shown in FIG. 4. This is believed to provide good dimensional integrity and surface quality for the 3D part while using a reciprocating build platen 68 and a nip roller 70. The resulting 3D part may exhibit visually observable layers with layer thicknesses depending on the thicknesses of the layers developed by EP engine **12*p* and the nip pressure at layer transfusion assembly 20**. Compositionally, the resulting 3D part includes the part material, such as the copolymer, charge control agent, heat absorber, flow control agent, and/or any additional additives.

PROPERTY ANALYSIS AND CHARACTERIZATION PROCEDURES

Various properties and characteristics of the part and support materials described herein may be evaluated by various testing procedures as described below:

1. Glass Transition Temperature and Heat Deflection Temperature

The glass transition temperature is determined using the classical ASTM method employing Differential Scanning calorimetry (DSC) ASTM D3418-12e1 and is reported in degrees Celsius. The test is performed with a DSC analyzer commercially available under the tradename "SEIKO EXSTAR 6000" from Seiko Instruments, Inc., Tokyo, Japan, with a 10-milligram sample of the support material copolymer. The data is analyzed using software commercially available under the tradenames "DSC Measurement V 5.7" and "DSC Analysis V5.5", also from Seiko Instruments, Inc., Tokyo, Japan. The temperature profile for the test includes (i) 25° C. to 160° C. heating rate 10 Kelvin/minute (first heating period), (ii) 160° C. to 20° C. cooling rate 10 Kelvin/minute, and (iii) 20° C. to 260° C. heating rate 10 Kelvin/minute (second heating period). The glass transition temperature is determined using only the heat flow characteristics of the second heating period.

The heat deflection temperature is determined pursuant to ASTM D648-07.

2. Particle Size and Particle Size Distribution

Particle sizes and particle size distributions are measured using a particle size analyzer commercially available under the tradename "COULTER MULTISIZER II ANALYZER" from Beckman Coulter, Inc., Brea, Calif. The particle sizes are measured on a volumetric-basis based on the D50 particles size, D10 particle size, and D90 particles size parameters. For example, a D50 particle size of 10.0 micrometers for a sample of particles means that 50% of the particles in the sample are larger than 10.0 micrometers, and 50% of the particles in the sample are smaller than 10.0 micrometers. Similarly, a D10 particle size of 9.0 micrometers for a sample of particles means that 10% of the particles in the sample are smaller than 9.0 micrometers. Moreover, a D90 particle size of 12.0 micrometers for a sample of particles means that 90% of the particles in the sample are smaller than 12.0 micrometers.

Particle size distributions are determined based on the D90/D50 distributions and the D50/D10 distributions. For example, a D50 particle size of 10.0 micrometers, a D10 particle size of 9.0 micrometers, and a D90 particle size of 12.0 micrometers provides a D90/D50 distribution of 1.2, and a D50/D10 distribution of 1.1.

As mentioned above, the geometric standard deviation $\sigma_g$ preferably meets the criteria pursuant to the above-shown Equation 1, where the D90/D50 distributions and D50/D10 distributions are preferably the same value or close to the same value. The "closeness of the D90/D50 distributions and D50/D10 distributions are determined by the ratio of the distributions. For example, a D90/D50 distribution of 1.2 and a D50/D10 distribution of 1.1 provides a ratio of 1.2/1.1=1.09, or about a 9% difference.

3. Triboelectric Charging

The triboelectric or electrostatic charging properties of powder-based materials for use in electrophotography-based additive manufacturing systems, such as system 10, may be determined with the following technique. A test sample of 7 parts by weight of the powder-based material is agitated in a clean dry glass bottle with 93 parts by weight of carrier particles. The carrier particles include a magnetized 22-micrometer core of strontium ferrite coated with 1.25% by weight of a polymer coating of poly(methyl methacrylate) (PMMA) for negative charging, or poly(vinylidene fluoride) (PVDF) for positive charging.

The mixture of the powder-based material and the carrier particles is agitated 25° C. on a jar roller for 45 minutes to ensure complete mixing of the carrier particles and the powder-based material, and to ensure equilibration of the Q/M ratios. This mixing simulates the mixing process that occurs in a development station of the electrophotography engine when the part or support materials are added to the carrier particles.

A sample of the mixture is then quantitatively analyzed with a TEC-3 Triboelectric Charge Analyzer (available from Torrey Pines Research, Fairport, N.Y.). This analyzer uses electric fields to strip the electrostatic powder from the carrier particle surface, and a rotating high-strength, planar multi-pole magnet to constrain the (magnetizable or permanently magnetized) carrier beads to a bottom electrode.

A 0.7-gram sample of the mixture (sample powder and carrier particles) is placed onto a clean stainless steel disc, which serves as the bottom electrode in a gap plate under an applied field. This bottom plate is mounted and positioned above the rotating multi-pole magnet, and a clean top plate disc electrode is mounted securely above the bottom plate, and parallel to it, so as to provide a controlled gap of 5 millimeters between the top and bottom electrode plates, using insulating polytetrafluoroethylene (PTFE under tradename "TEFLON") spacers at the electrodes' periphery.

If the powder is expected to charge negatively, a direct-current voltage of +1,500 volts is applied across the electrodes, and the magnetic stirrer is activated to rotate at 1500 rpm, so as to gently keep the carrier and powder under test constrained, but also slightly agitated on the bottom electrode, during the measurement. Alternatively, if the powder is expected to charge positively, then a negative bias voltage of −1,500 volts is applied. In either case, the applied electric field causes the powder to strip from the carrier, in the powder/carrier mixture, and to transfer to the top electrode, over a defined time period.

The stripped powder under test is deposited on the top electrode, and the induced accumulated charge on the top plate is measured using an electrometer. The amount of powder transferred to the top electrode is weighed, and compared to the theoretical percentage in the original carrier powder mix. The carrier remains on the bottom plate due to the magnetic forces constraining it.

The total charge on the top plate and the known weight of transferred electrostatic powder are used to calculate the Q/M ratio of the test powder, and to also check that all the electrostatic powder has transferred from the carrier, according to the theoretical amount originally mixed with the carrier beads. The time taken for complete powder transfer to the top plate, and the percent efficiency of the powder transfer process are also measured.

4. Powder Flowability

As discussed above, the part and support materials of the present disclosure preferably exhibit good powder flow properties. This reduces or prevents blockage or flow restrictions of the part or support material during the replenishment feeding, which can otherwise inhibit the supply of the part or support material to the carrier particles in the development station. The powder flowability of a sample material is qualitatively measured by visually observing the flowability of the powder in comparison to commercially-available toners utilized in two-dimensional electrophotography processes, which are rated as having "good flow" or "very good flow".

5. Melt Rheology

Preferably, the melt rheologies of the part and support materials are substantially the same as the melt rheologies of their respective copolymers, and are preferably not detrimentally affected by the other additives. Additionally, as discussed above, the part and support materials for use with electrophotography-based additive manufacturing systems (e.g., system 10) preferably have similar melt rheologies.

Melt rheologies of the part and support materials of the present disclosure, and their respective copolymers, are measured based on their melt flow indices over a range of temperatures. The melt flow indices are measured using a rheometer commercially available under the tradename "SHIMADZU CFT-500D" Flowtester Capillary Rheometer from Shimadzu Corporation, Tokyo, Japan. During each test, a 2-gram sample is loaded to the rheometer pursuant to standard operation of the rheometer, and the temperature of the sample is increased to 50° C. to cause a slight compacting of the sample.

The temperature is then increased from 50° C. at a rate of 5° C. per minute, allowing the sample to first soften and then flow. The rheometer measures the sample viscosity using the flow resistance of the melt to flow through a small die orifice, as a piston of the rheometer is driven through a cylinder. The rheometer records the softening point, the temperature at which flow begins, and the rate at which flow increases as a result of the temperature increase, until the cylinder is exhausted of sample melt. The rheometer also calculates the apparent viscosity in Pascal-seconds at each temperature point in the ramp. From this data, the apparent viscosity versus temperature profile can be determined.

Although the present disclosure has been described with reference to preferred embodiments, workers skilled in the art will recognize that changes may be made in form and detail without departing from the spirit and scope of the disclosure.

The invention claimed is:

1. A method for printing a three-dimensional part with an electrophotography-based additive manufacturing system having an electrophotography engine, a transfer medium, and a layer transfusion assembly, the method comprising:

providing a part material to the electrophotography-based additive manufacturing system, the part material compositionally comprising a charge control agent, and a thermoplastic material having a heat deflection temperature ranging from about 100° C. to about 150° C., wherein the thermoplastic material comprises polycarpolactum (PA6), polyhexamethyleneadipamide (PA6,6), polyhexamethylenenonamide (PA6,9), polyhexamethylenesebacamide (PA6,10), polyamide 6/12 (PA6,12), polyenantholactum (PA7), polyundecanolactum (PA11), polylaurolactam (PA12), or mixtures thereof and has a powder form having a D90/D50 particle size distribution and a D50/D10 particle size distribution each ranging from about 1.00 to about 1.40, and wherein the D90/D50 particle size distribution and the D50/D10 particle size distribution are within about 10% of each other;

triboelectrically charging the part material to a Q/M ratio having a negative charge or a positive charge, and a magnitude ranging from about 5 micro-Coulombs/gram to about 50 micro-Coulombs/gram;

developing layers of the three-dimensional part from the charged part material with the electrophotography engine;

electrostatically attracting the developed layers from the electrophotography engine to the transfer medium;

moving the attracted layers to the layer transfusion assembly with the transfer medium; and transfusing the moved layers to previously-printed layers of the three-dimensional part with the layer transfusion assembly.

2. The method of claim 1, wherein the powder form of the part material has a D50 particle size ranging from about 5 micrometers to about 30 micrometers.

3. The method of claim 1, wherein the part material further comprises a heat absorber, wherein the charge control agent constitutes from about 0.1% by weight to about 5% by weight of the part material, and wherein the heat absorber constitutes from about 0.5% by weight to about 10% by weight of the part material.

4. The method of claim 1, wherein the part material further comprises a flow control agent constituting from about 0.1% by weight to about 10% by weight of the part material.

5. The method of claim 1, wherein the polyamide comprises PA6; PA6,6; PA6,12; PA11; polylaurolactam (PA12), or mixtures thereof.

6. The method of claim 1, wherein providing a part material to the electrophotography-based additive manufacturing system comprises providing an interchangeable cartridge to the electrophotography-based additive manufacturing system, wherein the interchangeable cartridge comprises a supply of the part material.

7. The method of claim 1, wherein triboelectrically charging the part material comprises mixing the part material with carrier particles.

8. The method of claim 1, and further comprising:

electrostatically attracting developed layers of a support material to the transfer medium;

moving the attracted layers of the support material to the layer transfusion assembly along with the attracted layers of the part material; and transfusing the moved layers of the support material along with the moved layers of the part material with the layer transfusion assembly.

9. A method for printing a three-dimensional part with an electrophotography-based additive manufacturing system having an electrophotography engine, a transfer medium, and a layer transfusion assembly, the method comprising:

providing a part material to the electrophotography-based additive manufacturing system, the part material compositionally comprising a charge control agent, and a thermoplastic material having a heat deflection temperature ranging from about 100° C. to about 150° C., wherein the thermoplastic material comprises polycarpolactum (PA6), polyhexamethyleneadipamide (PA6,6), polyhexamethylenenonamide (PA6,9), polyhexamethylenesebacamide (PA6,10), polyamide 6/12 (PA6,12), polyenantholactum (PA7), polyundecanolactum (PA11), polylaurolactam (PA12), or mixtures thereof and has a powder form having a D90/D50 particle size distribution and a D50/D10 particle size distribution each ranging from about 1.00 to about 1.40 and wherein the D90/D50 particle size distribution and the D50/D10 particle size distribution are within about 10% of each other;

triboelectrically charging the part material to a Q/M ratio having a negative charge or a positive charge, and a magnitude ranging from about 5 micro-Coulombs/gram to about 50 micro-Coulombs/gram;

developing a layer of the three-dimensional part from the charged part material with the electrophotography engine;

electrostatically attracting the developed layer from the electrophotography engine to the transfer medium;

moving the attracted layers to the layer transfusion assembly with the transfer medium;

heating the developed layer on the transfer medium to a temperature that exceeds the glass transition temperature of the part material; and transfusing the heated layer to previously-printed layers of the three-dimensional part with pressure over time with a nip roller.

10. The method of claim 9, wherein the powder form of the part material has a D50 particle size ranging from about 5 micrometers to about 30 micrometers.

11. The method of claim 9, wherein the part material further comprises a heat absorber, wherein the charge control agent constitutes from about 0.1% by weight to about 5% by weight of the part material, and wherein the heat absorber constitutes from about 0.5% by weight to about 10% by weight of the part material.

12. The method of claim 9, wherein the part material further comprises a flow control agent constituting from about 0.1% by weight to about 10% by weight of the part material.

13. The method of claim 9, wherein the polyamide comprises PA6; PA6,6; PA6,12; PA11; polylaurolactam (PA12), or mixtures thereof.

14. The method of claim 9, wherein providing a part material to the electrophotography-based additive manufacturing system comprises providing an interchangeable cartridge to the electrophotography-based additive manufacturing system, wherein the interchangeable cartridge comprises a supply of the part material.

15. The method of claim 9, wherein triboelectrically charging the part material comprises mixing the part material with carrier particles.

16. The method of claim 9, and further comprising:

developing, electrostatically attracting, moving, heating and transfusing additional layers to form a stack of layers until the three-dimensional part is printed.

* * * * *